United States Patent [19]

Kasprzak

[11] Patent Number: 5,140,752
[45] Date of Patent: Aug. 25, 1992

[54] AUTOMOTIVE ADHESIVE EMBLEM REMOVER

[76] Inventor: Dennis Kasprzak, 25311 Loretta, Warren, Mich. 48091

[21] Appl. No.: 784,298

[22] Filed: Oct. 29, 1991

[51] Int. Cl.⁵ .............................................. B26B 3/00
[52] U.S. Cl. .................................... 30/169; 30/329
[58] Field of Search ............... 30/169, 329, 334, 335, 30/340, 342

[56] References Cited

U.S. PATENT DOCUMENTS

| | | | |
|---|---|---|---|
| 1,082,802 | 12/1913 | Full | 30/342 |
| 1,228,154 | 5/1917 | Williams | 30/169 |
| 1,492,553 | 5/1924 | Behrman | 30/335 |
| 3,201,867 | 8/1965 | Case | 30/169 |

Primary Examiner—Frank T. Yost
Assistant Examiner—Hwei-Siu Payer
Attorney, Agent, or Firm—Dykema Gossett

[57] ABSTRACT

An automotive adhesive emblem remover 10 is disclosed and, in one embodiment, comprises a substantially "C" shaped gripper 12 into which a separator blade 22 is removably inserted. More particularly, the blade 22 is adapted to be placed between one end of an emblem 28 and the surface 20 of an automobile and is thereafter made to traverse the length of the emblem 28 while being moved in alternating and opposite directions, perpendicular to the length of the emblem 28. In a second embodiment, the remover 32 is made of molded plastic, or other such material, and the blade 22(A) is molded within the gripper 12(A).

1 Claim, 1 Drawing Sheet

AUTOMOTIVE ADHESIVE EMBLEM REMOVER

FIELD OF THE INVENTION

This invention generally relates to an emblem remover and, more particularly, to an apparatus which is adapted to remove an emblem which has been adhered to a surface of an automobile.

DISCUSSION

Many types of emblems are fixed or glued to a surface of an automobile. One type of emblem is that which designates the manufacturer or model type of the automobile. These emblems are usually placed upon the automobile body during manufacture and serve to advertise the manufacturer and/or automobile type, as the automobile is driven.

A second type of automobile emblem is used to make the automobile aesthetically pleasing. These design emblems are normally selected by the automobile owner, after manufacture, and provide a desired design pattern which enhances the overall appearance of the vehicle. Both types of automobile emblems are relatively costly and many of the design emblems are very difficult or impossible to replace since many of them are produced in rather small quantities.

Normally, all of these aforementioned emblems are placed upon the automobile and are not removed unless damaged. However, in some instances, such as during repair or repainting of the automobile body, the emblems must be removed in order to allow all of the automobile surface to be exposed so that it may be properly repaired or repainted. After the necessary body repairs or repainting has been completed, the emblems are reapplied to the body.

Due to the relatively high cost and replacement difficulty associated with these emblems, this emblem removal must be done with great care in order to prevent damage or destruction to the emblem. Moreover, such removal must also be done in a manner which avoids damage or destruction to the automobile body or surface, so as to prevent any increase in repair costs.

Most often, a knife has been used to slice or separate the emblem away from the automobile body. More particularly, one edge of the knife has normally been inserted between a corner of the emblem and the automobile surface. Thereafter, the knife is normally made to slice the emblem away from the body. While this approach has been very effective in removing the emblem from the body, it has oftentimes resulted in damage to both the emblem and to the body, thereby costing the automobile owner much time and resources in locating and purchasing a new emblem as well as in paying for additional, and unneeded body repairs.

SUMMARY OF THE INVENTION

It is an object of this invention to provide an automotive adhesive emblem remover which is adapted to remove an emblem from an automobile.

It is a further object of this invention to provide an automotive adhesive emblem remover which is adapted to be inserted between an emblem and the automobile, and which allows the emblem to be removed from the automobile without causing appreciable damage to either the emblem or the automobile.

It is yet another object of this invention to provide an automotive adhesive emblem remover which is adapted to be inserted between an emblem and an automobile and which is further adapted to be moved along the length of the emblem while also being moved in alternating directions, perpendicular to the emblem length in order to allow removal of the emblem from the automobile, without appreciable damage to either the emblem or the automobile.

According to a first aspect of this invention an automobile emblem remover is provided which comprises a blade; and means, fixed to the blade, for allowing the blade to be positioned between the emblem and the automobile and thereafter for allowing the blade to be moved in alternating and opposite directions as the blade traverses the length of the emblem thereby, allowing the emblem to be removed from the automobile.

According to a second aspect of this invention an apparatus for removing an emblem attached to a surface of an automobile is provided, the apparatus comprising first and second side members, each of said side members being adapted to be grasped by a hand; and a blade, positioned between said side member and adapted to be movably inserted between the emblem and the automobile thereby, allowing the emblem to be removed from the automobile surface as the first and second side members are moved, by the hand across the length of the emblem.

Further objects, features and advantages of the invention will become apparent from a consideration of the following description and from the appended claims when taken in connection with the accompanying drawings.

BRIEF DESCRIPTION OF THE DRAWINGS

Various advantages of the present invention will become apparent to those skill in the art by reading the following specification and by reference of the following drawings in which.

DETAILED DESCRIPTION OF THE INVENTION

Figure 1:
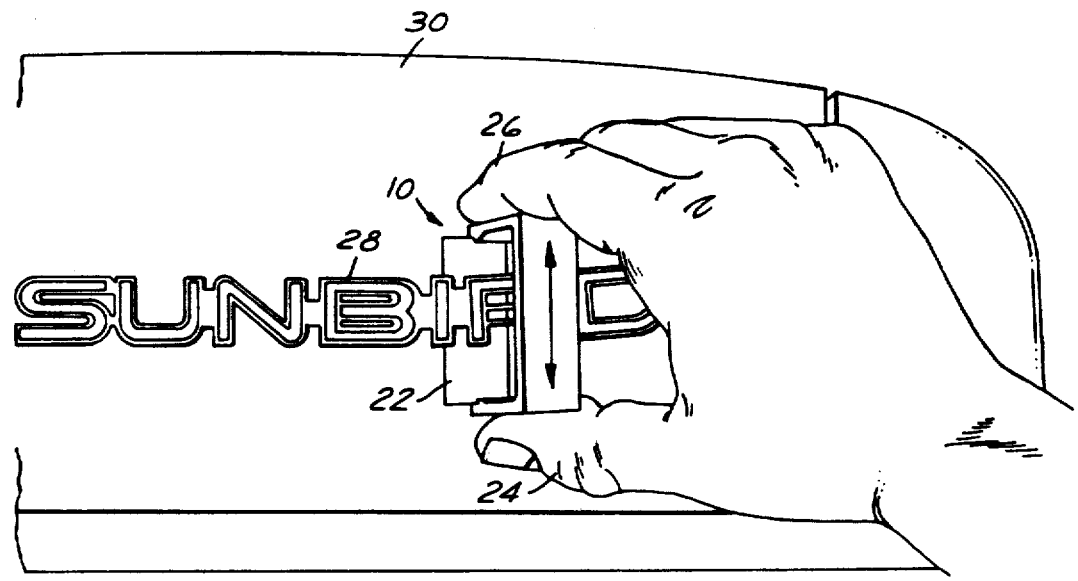
FIG. 1 is an illustration of an automotive adhesive emblem remover, made in accordance with the teachings of a first embodiment of this invention and further illustrating the removal of a typical automotive emblem from the surface of an automobile by use of the emblem remover of the first embodiment of this invention.
Figure 2:
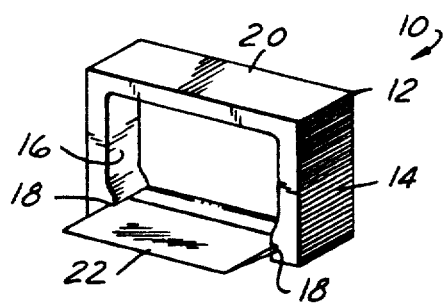
FIG. 2 is a partial perspective view of the automotive adhesive emblem remover, shown in FIG. 1.
Figure 3:
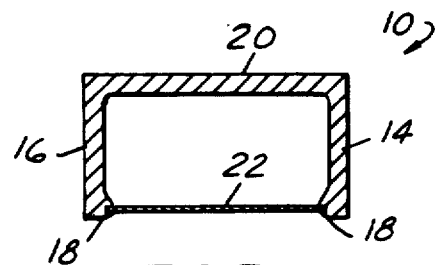
FIG. 3 is a back view of the automotive adhesive emblem remover, shown in FIG. 2.

Referring now to FIGS. 1-3 there is shown an automotive adhesive emblem remover 10, made in accordance with the teachings of a first embodiment of this invention. As shown, remover 10 includes a substantially "C" shaped gripper 12 having generally planar side members 14, 16, each side member 14, 16 having a razor blade reception notch 18. Moreover, gripper 12 further includes a top planar member 20, coupled to and overlaying both members 14 and 16. Further, as shown, remover 10 also includes an emblem separator blade (such as a razor blade) 22 which is adapted to be removably inserted within notches 18, and to horizontally project away from gripper 12 in a plane which is substantially parallel to member 20.

In operation, side member 14 and 16 are adapted to be grasped by a thumb 24 and a forefinger 26, respectively. Thereafter, blade 22 is placed between one end of typical emblem 28 and the automobile surface 30. Blade 22 is made to traverse the length of emblem 28 while being moved in alternating and opposite directions, which is perpendicular to the length of emblem 28, while always remaining parallel to the emblem 28 and surface 30. In this manner, emblem 28 may be easily removed from automobile surface 30 without appreciable damage to either the emblem 28 or surface 30 itself. Moreover, it should be appreciated by one of ordinary skill in the art that separator blade 22 may be easily replaced with another blade, if it should break or become dull.

Figure 4:
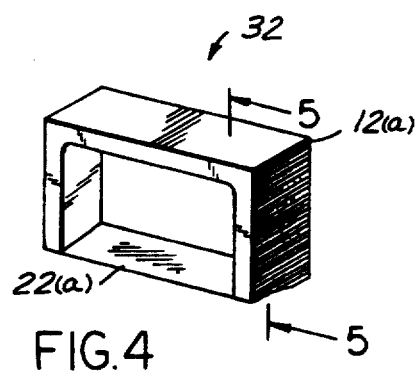
FIG. 4 is a partial perspective view of an automotive adhesive emblem remover, made in accordance with the teachings of a second embodiment of this invention.
Figure 5:
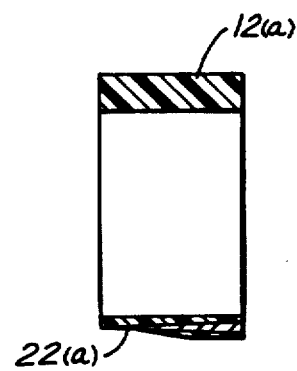
FIG. 5 is a sectional view of the automotive adhesive emblem remover, shown in FIG. 4 and taken along the line 5-5'.

Referring now to FIGS. 4 and 5 there is shown emblem remover 32, made in accordance with the teachings of a second embodiment of this invention. As shown, emblem remover 32 differs from remover 10 (as shown in FIGS. 1-3) in that blade 22(A) is non-removably molded within a side members 14, 16 and is made to be of substantially the same width as each members 14, 16.

In this second embodiment, gripper 12(A) is normally made of plastic and is molded into a single piece, with blade 22(A) inserted therein. In this manner, this second emblem remover 32 may be used until blade 22(A) is made dull or becomes broken, and thereafter the entire gripper 12(A) may be easily disposed of or thrown away.

It is to be understood that the invention is not limited to the exact construction or method illustrated and described above, but that various changes and modifications may be made without departing from the spirit and scope of the invention as defined in the following claims.

I claim:

1. An apparatus for removing an emblem attached to an automobile, said apparatus comprising:

a substantially "c" shaped gripper having a top planar member coupled to and overlaying first and second side members, said first and second side members being adapted to be held between a thumb and a finger said first side member having an inner surface facing an inner surface of said second side member, each said inner surface having a longitudinal reception notch, said notches being in a plane parallel to said top planar member; and cutting means removably received within said notches, said cutting means having a cutting edge and being positioned underneath and parallel to said top planar member, whereby said cutting means can be inserted between said emblem and said automobile for removing said emblem from said automobile.

* * * * *